United States Patent [19]

Wall, Jr.

[11] 3,905,586

[45] Sept. 16, 1975

[54] MINI-PLANT FOR BATCHING AND MIXING MATERIALS

[76] Inventor: Robert N. Wall, Jr., 2309 Dawn Dr., Georgetown, Tex. 78626

[22] Filed: Oct. 15, 1974

[21] Appl. No.: 514,502

[52] U.S. Cl. .............................. 259/154; 259/154
[51] Int. Cl.² ........................................... B28C 5/08
[58] Field of Search ........... 259/154, 149, 160, 161, 259/162, 163, 164, 165, 168, 166, 18, 23, 24, 25, 26

[56] References Cited
UNITED STATES PATENTS

| | | | |
|---|---|---|---|
| 2,867,336 | 1/1959 | Soldini | 259/154 |
| 3,251,484 | 5/1966 | Hagan | 259/154 |
| 3,343,688 | 9/1967 | Ross | 259/154 |
| 3,667,736 | 6/1972 | Carroll | 259/161 |

*Primary Examiner*—Robert W. Jenkins

[57] ABSTRACT

A mini-plant which may be either portable or stationary for batching and mixing concrete or any other materials which may be placed in bins and weighed into a batch, said mini-plant comprising a silo for storing fine dry particles, bin means for storing coarse materials, dry materials weigh bin means, wet material weigh bin means, and mixer means mounted on a common support frame. The coarse materials storage bin means comprises at least two separate compartments for independent storage of different materials therein. The dry materials weigh bin means comprises at least two compartments for independent weighing of different materials therein. First conveying means extends between the fine particles storage silo to one compartment of the dry weigh bin means whereby preselected quantities of the fine particles, by weight, may be conveyed and loaded into said one compartment. Second conveying means extends between one compartment of the coarse materials storage bin means to the second compartment of the dry materials weigh bin means for conveying preselected quantities of one coarse material, by weight, for loading into said second compartment. Third conveying means extends between the second compartment of the coarse materials storage bin means to the said second compartment of the dry materials weigh bin means for conveying preselected quantities of another coarse material, by weight for loading into said second dry materials weigh bin compartment. All compartments of the dry materials weigh bin means, and the wet materials weigh bin means are in communication with the mixer means for loading said weighed materials therein for mixing thereof.

9 Claims, 3 Drawing Figures

PATENTED SEP 16 1975

3,905,586

MINI-PLANT FOR BATCHING AND MIXING MATERIALS

BACKGROUND OF THE INVENTION

1. Field of the Invention

This invention relates to improvements in materials batching and mixing apparatus and more particularly, but not by way of limitation, to a mini-plant for batching and mixing materials which may be moved from site to site for producing relatively small quantities of batched and mixed materials at the site wherein the materials are required.

2. Description of the Prior Art

There are many instances wherein relatively small batches of concrete, or the like, are required, and these small batches become excessively expensive and hard to obtain since the quantities are frequently too small for a full load of the usual ready-mix type mixer vehicle, and the supplier of the concrete must either charge excessive rates for delivery of a partially full mixer load, of delay delivery of the small batch until such time as a spare mixer might be available or not otherwise in use. For example, precast concrete manufacturers, concrete pipe manufacturers, concrete block manufacturers, grouting contractors, and the like, frequently require multiple numbers of relatively small individual loads of concrete. These manufacturers must either pay excessive prices for the delivered concrete they need, suffer from slow delivery, or mix the small batches in small hand mixers, using manual labor to feed and operate said small mixers. The use of small mixers is also disadvantageous in that manual labor is very expensive, and the small mixers are too slow. As a result the cost of the end products of these manufacturers is usually too high.

SUMMARY OF THE PRESENT INVENTION

The present invention contemplates a mini-plant which may be either stationary or portable, and may be set up at the job site wherein relatively small batches of concrete, or any other materials which may be batched, are needed. The novel mini-plant comprises a silo for storing dry cement, aggregate storage bin means, combined cement weigh bin means and aggregate weigh bin means, water weigh means, and mixer means mounted on a common support frame whereby multiple numbers of relatively small concrete batches may be produced at the site wherein they are to be used. A cement screw, or the like, extends from the cement silo to the cement weigh bin means for delivery of dry cement thereto for charging thereof with a preselected quantity of dry cement, by weight. The aggregate bin is provided with at least two separate compartments for storage of different materials therein, such as sand in one compartment and gravel in the second compartment. First conveyor belt means extends from one compartment to the aggregate weigh bin means for transporting one material, such as gravel, to the aggregate weigh bin means for charging thereof with a preselected quantity of gravel by weight. Second conveyor belt means extends from the second compartment to the aggregate weigh bin means for transporting the second material, such as sand, to the aggregate weight bin means for depositing a preselected quantity thereof, by weight, in the aggregate weigh bin means. The water weigh bin, cement weigh bin and aggregate weigh bin are all in communication with the mixer means for discharging the contents of each bin into the mixer for mixing thereof to produce the desired concrete batch.

A suitable electronic weighing system is provided for the apparatus wherein the desired weight for each component may be dialed into the weighing system. When the preselected weight of material has been loaded into the weigh bins, the flow of the materials thereto is automatically stopped, thus assuring that the proper quantities and ratios of ingredients or components for the concrete have been measured for loading into the mixer means. The mixer means is utilized in the usual manner for mixing the batches of concrete, and discharging thereof for use. Of course, it will be apparent that a second or subsequent weighing operation or loading operation of the weigh bins may take place simultaneously with the mixing operation, thus increasing the speed of producing multiple concrete batches when desired.

DESCRIPTION OF THE PREFERRED EMBODIMENT

Figure 1:
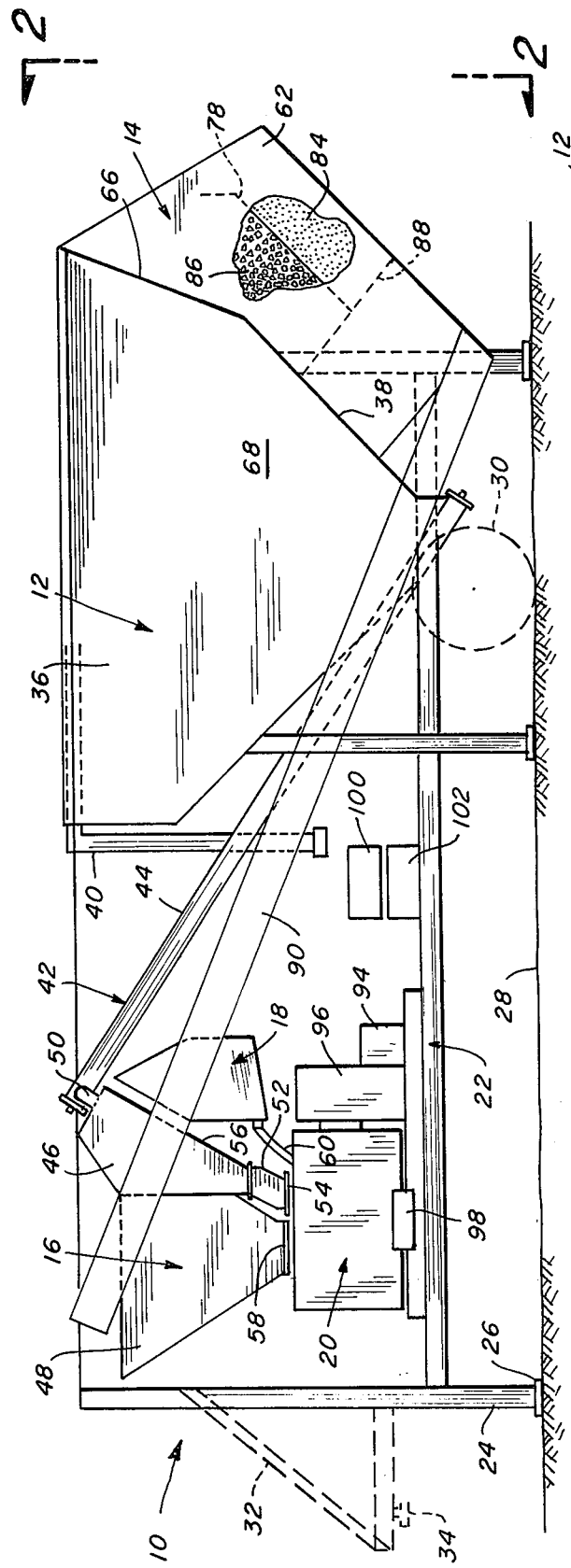
FIG. 1 is a side elevational view of a mini-plant for batching and mixing materials embodying the invention, with portions depicted in broken lines for purposes of illustration.

Referring to the drawings in detail, reference character 10 generally indicates a materials batching and mixing mini-plant. Whereas the particular materials set forth in detail herein relate to concrete batching and mixing, it is to be understood that substantially any desired materials may be utilized wherein it is desired to batch and mix materials, such as hard crushed rock, pea gravel, pit run stone, lime, flyash, bentonite, phosphate, lightweight stone, and the like.

The mini-plant 10 comprises a dry cement storage silo 12, aggregate storage bin means 14, dry materials weigh bin means 16, wet materials weigh bin means 18, and mixer means 20 mounted on a common support frame generally indicated at 22. The frame 22 may be of any suitable type and is provided with a plurality of spaced leg members 24 having adjustable or telescopically arranged feed members 26 for supporting the apparatus 10 on the surface 28 of the ground. In addition, a pair of wheels 30 (only one of which is shown in FIG. 1) are suitably journalled on the frame 22 for engagement with the surface of the ground 28 in lieu of the legs 24 when the apparatus 10 is to be moved from site to site. In addition, a suitable king pin support structure 32 (shown in dotted lines in FIG. 1) is removably secured to the support frame 22 in any well known manner and is provided with a king pin 34 for engagement with the usual fifth wheel (not shown) of a tow tractor vehicle (not shown) for a purpose as will be hereinafter set forth.

The silo 12 as shown herein comprises a main housing portion 36 having a generally funnel shaped lower portion 38 conterminous therewith for housing or storing a supply of dry cement therein. The upper end of the main housing portion 36 is preferably closed and one side of the housing portion 36 is provided with a suitable aperture (not shown) for receiving one end of a usual air slide fill tube 40 therethrough. The dry cement to be loaded into the silo is normally transported or hauled in a transport tanker vehicle (not shown) and blown into the interior of the silo 12 through the air slide fill tube 40, as is well known. The lower end of the funnel portion 38 is in open communication with a suitable cement screw apparatus 42 which extends from the lower end of the funnel 38 to the dry materials weigh bin 16, as particularly shown in FIG. 1 for transporting the dry cement from the silo 12 to the weigh bin 16 as will be hereinafter set forth. The cement screw apparatus 42 may be of any suitable type and usually comprises a screw or auger member (not shown) encased within a steel tube 44, said screw or auger member receiving the dry cement which drops into the screw by gravity from the funnel portion 38 and moving the dry cement longitudinally through the tube 44 for discharge into the weigh bin 16.

The weigh bin 16 is suspended by three suitable load cells (not shown) and as shown herein comprises two separate compartments or weigh bins 46 and 48, each compartment being provided for receiving different materials therein. The compartment 46 is preferably a dry cement receiving and weighing compartment and is preferably closed and water tight at the upper end thereof. However, the upper end of the screw apparatus 42 is in communication with the interior of the chamber or compartment 46 through a conduit 50, or the like, whereby the dry cement being lifted within the tube 44 will fall into the interior of the compartment 46 by gravity. A suitable discharge outlet 52 is provided at the lower end of the cement weigh compartment or bin 46 for discharge of dry cement therefrom by gravity, and a suitable gate member 54 cooperates with the outlet 52 for selective discharge of the dry cement therefrom, as is well known. In addition, at least one side 56 of the cement weigh compartment or bin 46 is preferably tapered inwardly and downwardly toward the outlet 52 for facilitating the gravity flow of the dry cement to and through the outlet 52 and gate 54.

The outlet 52 is in communication with the interior of the mixer 20 through the gate member 54 for discharging dry cement from the cement weigh bin 46 into the mixer 20, as will be hereinafter set forth. In addition, the gate 54 is preferably actuated by a suitable air cylinder (not shown). The air source for actuation of the air cylinder may be an air compressor (not shown) mounted on the support structure 22, or may be outside air which may be provided at the site wherein the plant 10 is to be utilized.

The aggregate weigh compartment or bin 48 as shown herein is preferably substantially funnel shaped and is provided with an outlet (not shown) at the lower end thereof having a suitable gate member 58 provided for selective opening of the outlet for discharge of materials therethrough. The gate member 58 is preferably actuated by a suitable air cylinder (not shown) in the manner as set forth in connection with the gate 58. The upper end of the aggregate weigh compartment 48 is preferably open and is in communication with the aggregate storage bin 14 for receiving materials therefrom as will be hereinafter set forth.

The water weigh bin 18 may be of any suitable construction, and may be filled with water by a suitable hose or conduit (not shown) having a suitable entry valve (not shown) or any other suitable manner. The water weigh bin 18 is suspended from a single load cell (not shown) and when the preselected quantity of water by weight has been loaded into the bin 18, the flow of water thereto is stopped. The bin 18 is in communication with the interior of the mixer 20 through a suitable line or conduit 60, and of course suitable valveing (not shown) may be interposed in the conduit 60 for controlling the discharge of the water from the bin 18 and into the mixer 20.

Figure 3:
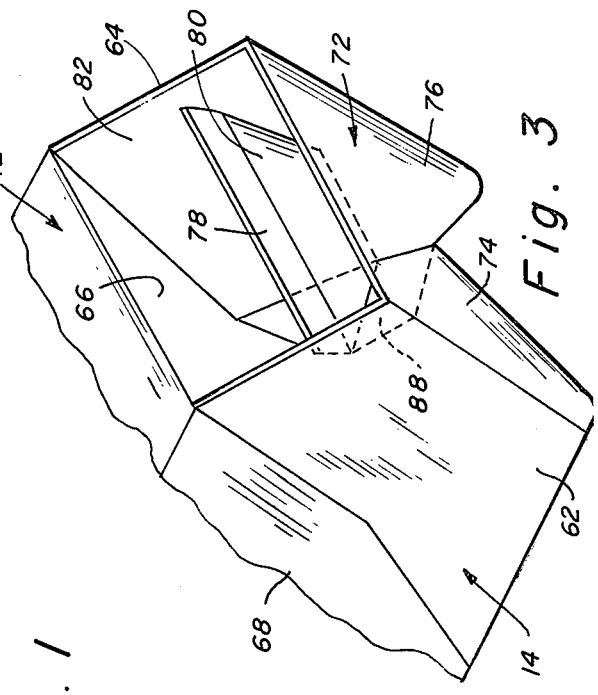
FIG. 3 is a perspective view of the aggregate storage bin such as may be used in the invention.
Figure 2:
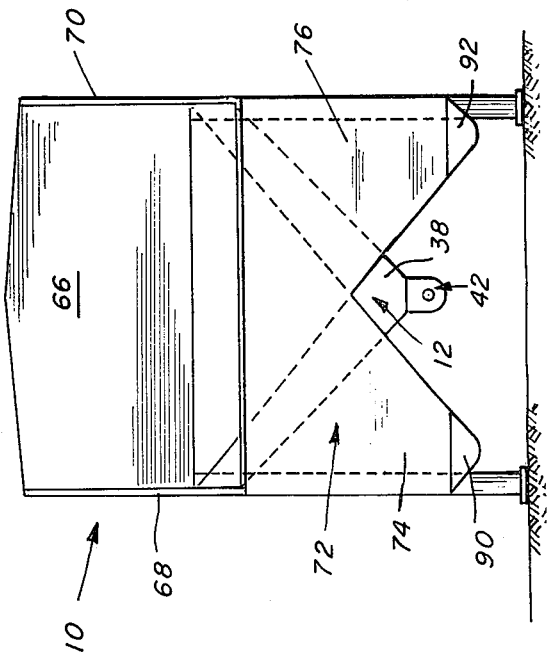
FIG. 2 is an end elevational view taken on line 2—2 of FIG. 1.

The aggregate storage bin generally indicated at 14 comprises a pair of spaced substantially identical side plates 62 and 64 secured to the exposed end wall 66 of the silo 12 in any suitable manner and extending outwardly therefrom substantially coplanar with respect to the sidewalls 68 and 70 of the silo 12. The outer edges of the plates 62 and 64 are spaced apart by a plate member 72 having a pair of substantially identical oppositely disposed V-shaped projection members 74 and 76. The opposite side of the bin 14 from the plate 72 is closed by the wall 66 of the silo 12 and suitable bottom plates (not shown) are provided for the bin 14 as is well known. A transversely extending plate 78 (FIG. 3) is welded or otherwise secured between the plates 62 and 64 for separating the bin 14 into two compartments 80 and 82, with the compartment 80 preferably receiving sand 84 therein, and the compartment 82 preferably receiving gravel 86 therein. A divider plate 88 is also provided therein whereby the sand 84 will be loaded tinto the compartment 80 and fall by gravity into the interior of the bin 14 confined by the V-shaped element 76, and the gravel 86 will be loaded into the compartment 82 and fall by gravity into the interior of the bin 14 confined by the V-shaped element 74.

The lower end of the gravel compartment 82 is open to a conveyor belt apparatus 90 which extends from the bottom of the compartment 82 angularly upwardly to the open upper end of the aggregate weigh compartment or bin 48 for carrying the gravel from the compartment 82 to the bin 48 for loading of the bin 48, as will be hereinafter set forth. The lower end of the compartment 80 is similarly in open communication with a conveyor belt apparatus 92 which extends from the lower end of the compartment 80 to the upper end of the aggregate weigh bin 48 in spaced substantially parallel relationship with respect to the conveyor belt apparatus 90 whereby both conveyor devices independently load material into the aggregate weigh bin 48. It is to be noted that the inwardly and downwardly directed configuration of the funnel portion 38 of the silo 12 provide clearance along the under or lower sides of the silo 12 for receiving the conveying devices 90 and 92 therealong in order to permit a compact construction for the mini-plant 10.

The mixer 20 may be of any suitable type, such as a spiral blade type, turbine type, pan type, or the like, and may be driven by a suitable power source 94 through a gear box or transmission 96, as is well known. The mixer 20 is preferably provided with the usual dump door 98 for discharge of the contents thereof as will be hereinafter set forth A suitable electronic weighing system generally indicated at 100 is mounted on the support frame 22 in a convenient place in any well known manner and is operably connected with the load cells supporting the weigh bins in any suitable or well known manner (not shown). Whereas the weighing system may be of any suitable type, it is preferable to use the electric solid state digital weigh system known by the name Weigh System, and which is manufactured by Weigh Systems, Inc., Austin, Texas. In addition, a suitable control console 102 is mounted on the support frame 22 and has suitable electric buttons (not shown) thereon for control of the air cylinders (not shown) associated with the gates 56 and 58. Of course, manual levers (not shown) may be utilized for operation of the gates 52 and 58, if desired, in lieu of the electrically controlled air cylinders.

The apparatus 10 may be transported to a site wherein relatively small multiple numbers of concrete batches are desired, and set up to provide a mini-plant at the site. The feet 26 may be elevated from the surface 28 of the ground in any well known manner in order that the wheels 30 may roll freely therealong, and the king pin 34 may be secured to the usual fifth wheel (not shown) of a suitable tow tractor (not shown). The entire apparatus may be pulled along a highway, or the like, by the tow tractor for movement to the desired location therefor. At the selected site for the mini-plant 10, the feed 26 may be moved into engagement with the surface 28 of the ground for efficiently supporting the apparatus 10 in a stable working condition.

As hereinbefore set forth, the silo 12 is preferably preloaded with a supply of dry cement by blowing the cement from a suitable transport tanker through the air slide fill tube 40. In addition, the compartments 80 and 82 are preferably filled with sand and gravel, respectively, by the usual front end loader. The sand and gravel move downwardly, forwardly, and outwardly toward their respective conveyor belt devices by gravity, thus greatly reducing the number of moving parts in the apparatus 10.

To start the operation of the mini-plant 10, the operator of the apparatus may dial the desired quantities of cement, gravel, sand and water, by weight, into the weigh control system 100 in the usual manner. The operator then manually presses the batch button (not shown) of the weigh system which starts two weighing systems, one being a wet system and the other being a dry system. The wet system initiates the flow of water into the water weigh bin 18. As hereinbefore set forth, the water weigh bin 18 is suspended from one load cell and when the preselected amount of water, by weight, has accumulated within the bin 18, the water entry valve (not shown) is automatically shut for stopping the flow of water into the bin 18.

Simultaneously with the filling of the water bin 18, the cement screw apparatus 42 is activated for moving the dry cement from the silo 12 to the cement weigh bin 46. As hereinbefore set forth, the dry materials weigh bin 16 is suspended by three load cells, and when the desired or preselected quantity of dry cement by weight has been loaded into the cement weigh bin 46, the actuation of the cement screw apparatus 42 is automatically stopped.

The belt conveyor apparatus 90 is then automatically activated for moving gravel 86 from the gravel compartment 82 to the aggregate weigh bin 48. When the preselected quantity of gravel by weight has been deposited in the bin 48, the operation of the conveyor apparatus 90 is automatically stopped, and the conveyor apparatus 92 is automatically activated. The conveyor apparatus 92 moves sand 84 from the compartment 80 to the aggregate weigh bin 48 and deposits the sand on top of the gravel previously loaded therein. When the preselected quantity of sand by weight has been loaded into the aggregate weigh bin 48, the actuation of the conveyor apparatus 92 is stopped. The batching operation is now complete, with the proper quantities of water, cement, sand and gravel having been loaded in the respective weigh bins.

The batch components or ingredients are now ready to be discharged into the mixer 20. As hereinbefore set forth, each weigh bin is provided with discharge means or gates at the lower end thereof whereby the contents of each weigh bin may fall by gravity into the mixer 20. The ingredients or components may be dumped into the mixer 20 one at a time, or simultaneously, as desired, and the mixer 20 may be used in the usual manner for mixing the ingredients to produce the desired concrete batch. The finished concrete batch may be removed from the mixer 20 through the dump door 98 in the usual manner.

While the mixer 20 is being utilized for mixing a concrete batch, another batch may be started and weighed in all three of the weigh bins in the manner as hereinbefore set forth to provide a faster batching and mixing cycle.

From the foregoing it will be apparent that the present invention provides a novel mini-plant for producing multiple numbers of relatively small concrete batches at the site wherein the concrete is to be utilizd. The novel mini-plant provides storage means for storing a supply of dry cement and aggregate, and weigh bins for weighing the components or ingredients of a concrete batch and dumping said weighed components into a mixer for producing the desired concrete batch. The means for storing the aggregate components is in communication with the aggregate weigh bin means through conveyor devices which are disposed along the underside of the cement storage means for moving the aggregate to the weigh bin in a manner providing a minimum space requirement, thus permitting the overall construction of the mini-plant to be compact. The means for storing the dry cement is in communication with the cement weigh bin through cement screw means for efficiently delivery of the dry material to the cement weigh bin. In addition, the materials to be conveyed to the dry materials weigh bins fall into the respective conveying devices by gravity and all the materials fall into the mixer by gravity, thus maintaining the number of moving parts at a minimum for reducing the expense of manufacture and operation. The novel mini-plant is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is claimed is:

1. A mini-plant for batching and mixing materials comprising support frame means, storage silo means for dry fine particles secured to the support frame means, storage bin means for coarse dry materials secured to the silo means, dry materials weigh bin means secured to the support frame means, first conveying means extending between the silo means and the dry materials weigh bin means for transporting a preselected quantity of dry fine particles thereto by weight, second conveying means extending between the storage bin means and the dry materials weigh bin means for transporting the coarse materials thereto in a preselected quantity by weight, wet weigh bin means secured to the support frame means, and mixer means secured to the support frame means and in communication with the dry materials weigh bin means and the wet material weigh bin means for receiving the contents of the weigh bins therein for mixing thereof to produce the desired end product.

2. A mini-plant as set forth in claim 1 wherein the dry materials weigh bin comprises at least two separate compartments, one of said compartments being in communication with the silo means, and the other of said compartments being in communication with the storage means for coarse materials.

3. A mini-plant as set forth in claim 2 wherein the first conveying means comprises screw means for moving the dry fine particles from the silo means to the said one compartment, and the second conveying means comprises belt conveyor means for moving the coarse materials from the coarse materials storage bin to the said other compartment.

4. A mini-plant as set forth in claim 1 wherein the coarse materials storage bin comprises at least two separate compartment for storing different materials therein.

5. A mini-plant as set forth in claim 4 wherein the second conveying means comprises independent belt conveyor means extending between each coarse materials compartment and the dry materials weigh bin means for independently delivering the different materials thereto.

6. A mini-plant as set forth in claim 1 wherein the silo means deposits the dry fine particles on the first conveying means by gravity, and the coarse materials storage bin means deposits the coarse materials on the second conveying means by gravity.

7. A mini-plant as set forth in claim 1 wherein the dry materials weigh bin comprises two separate bins, one of said bins being in communication with the silo means for receiving the dry fine particles therefrom, the other of said bins being in communication with the coarse materials storage bin means, and said coarse materials storage bin means comprises at least two compartments for storing different materials therein, each of said compartments being in independent communication with the said other of said weigh bins.

8. A mini-plant as set forth in claim 1 wherein the silo means includes a substantially funnel shaped lower portion, and the coarse materials bin means comprises at least two separate compartments for storing different materials therein, and the second conveying means comprises independent belt conveyor means extending from each coarse materials compartment to the dry materials bin and extending along the underside of the silo on opposite sides thereof for providing a compact construction for the mini-plant.

9. A mini-plant as set forth in claim 1 and including weigh system means operably connected with the dry materials weigh bin means and wet materials weigh bin means for automatic loading of the bins with preselected quantities of material by weight.

* * * * *